(12) United States Patent
McGarity et al.

(10) Patent No.: US 6,266,807 B1
(45) Date of Patent: Jul. 24, 2001

(54) METHOD AND SYSTEM FOR EXECUTING INSTRUCTIONS IN AN APPLICATION-SPECIFIC MICROPROCESSOR

(75) Inventors: Ralph McGarity; Franz Steininger; Jean Casteres, all of Toulouse (FR)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/150,218

(22) Filed: Sep. 9, 1998

(30) Foreign Application Priority Data

Sep. 9, 1997 (EP) .................................................. 97402090

(51) Int. Cl.[7] ........................................................ G06F 9/45
(52) U.S. Cl. ............................................... 717/5; 712/209
(58) Field of Search .............................. 712/36, 327, 35, 712/32, 209, 210, 208, 227; 717/7, 5, 2, 6, 8; 703/20, 26; 455/426, 552, 553

(56) References Cited

U.S. PATENT DOCUMENTS

| | | | |
|---|---|---|---|
| H1385 | * 12/1994 | Stickel et al. | 712/36 |
| 5,550,893 | * 8/1996 | Heidari | 455/553 |
| 5,652,852 | * 7/1997 | Yokota | 712/208 |
| 5,794,010 | * 8/1998 | Worrell et al. | 703/20 |
| 5,826,089 | * 10/1998 | Ireton | 717/7 |
| 5,872,978 | * 2/1999 | Hoskins | 717/7 |
| 6,029,000 | * 2/2000 | Woolsey et al. | 717/5 |
| 6,044,267 | * 3/2000 | Foladare et al. | 455/426 |

FOREIGN PATENT DOCUMENTS

| | | |
|---|---|---|
| 0718760 | 6/1996 | (EP) . |
| 2294844 | 5/1996 | (GB) . |

OTHER PUBLICATIONS

Michael P. Plezbert et al., Does "Just in Time" = "Better Late than Never"? CONFERENCE RECORD OF POPL '97: the 24th ACM SIGPLAN–SIGACT SYMPOSIUM ON PRINCIPLES OF PROGRAMMING LANGUAGES, PARIS, FRANCE, 15–17 Jan. 1997, ISBN 0–89791–853–3, 1997, NEW YORK, NY, USA, ACM, USA, pp. 120–131, XP002054081.

Gabriel M. Silberman et al., "An Architectural Framework for Supporting Heterogeneous Instruction–Set Architectures"COMPUTER, vol. 26, No. 6, Jun. 1, 1993, pp. 39–56, XP000377627.

* cited by examiner

Primary Examiner—John A. Follansbee
(74) Attorney, Agent, or Firm—Lanny L. Parker

(57) ABSTRACT

A method for executing instructions on an application-specific microprocessor having a machine language is described. Microcontroller-like instructions are provided in a virtual language for execution on the processor. High-level DSP-like functions are compiled into DSP-like instructions in the machine language for execution on the processor. The microcontroller-like instructions are combined with the DSP-like instructions to produce a program, the program having a virtual language portion and a machine language portion respectively. When the program is executed, the virtual language portion of the program is translated into machine language instructions, and the machine language portion of the program is directly executed, such that the application-specific microprocessor executes both the DSP-like instructions and the microcontroller-like instructions.

10 Claims, 3 Drawing Sheets

METHOD AND SYSTEM FOR EXECUTING INSTRUCTIONS IN AN APPLICATION-SPECIFIC MICROPROCESSOR

FIELD OF THE INVENTION

This invention relates to a method for executing instructions in a microprocessor, and particularly but not exclusively to such a method for use in a portable communications device such as a mobile telephone.

BACKGROUND OF THE INVENTION

In a mobile telephone, data to be transmitted or received over an air interface requires complex processing according to dedicated algorithms.

In order to facilitate such complex processing, in addition to having a microcontroller for providing control of the features and functions of the mobile telephone, a mobile telephone typically has a Digital Signal Processor (DSP), dedicated to handling the transmitted and received data.

A program is written for the microcontroller, incorporating the desired features and functions. This program may be written in a virtual (intermediate) language, using a software tool. The microcontroller has a translator (on- or off-chip), which translates the virtual language into native machine language as the program is executed.

In contrast to the above, a short amount of code is written for the DSP, containing the required algorithms. This code must be written in native machine language, because software compilers cannot currently handle DSP-like code, and because the algorithms require fast processing, not compatible with a virtual language using translators.

If a new DSP is designed for use in a mobile telephone, a microcontroller is also designed or selected for the unit. Typically a number of software teams are involved in order to provide all of the above software. A team is required to write the virtual language program, another team is required to write the code for the DSP. Yet another team must write a translator for the microcontroller and the DSP.

A problem with this arrangement is that with new generations of mobile telephones being produced at a rapid rate, with new microcontrollers and DSPs, the overhead in software development time can add a significant delay to the completion of a new mobile telephone design.

This invention seeks to provide a method and system for executing instructions in a microprocessor which mitigate the above mentioned disadvantages.

SUMMARY OF THE INVENTION

According to a first aspect of the present invention there is provided a method for executing instructions on an application-specific microprocessor having a machine language, comprising the steps of: providing microcontroller-like instructions in a non-directly executable format, for execution on the processor; compiling high-level DSP-like functions into DSP-like instructions into a directly executable format for execution on the processor; combining the microcontroller-like instructions with the DSP-like instructions to produce a program, the program having a non-directly executable portion and a directly executable portion respectively; executing the program by pre-processing the non-directly executable portion of the program into directly executable instructions, and by directly executing the directly executable portion of the program, such that the application-specific microprocessor executes both the DSP-like instructions and the microcontroller-like instructions.

Preferably the non-directly executable format is a virtual language, and the pre-processing is a virtual-to-machine language translation, arranged to translate the non-directly executable portion of the program into the machine language.

The method preferably further comprises the step of compressing the virtual language microcontroller-like instructions before the combining step; and the pre-processing step preferably also includes a decompression step arranged to decompress the non-directly executable portion of the program before the translation step.

According to a second aspect of the present invention there is provided a microprocessor system for executing instructions, comprising:- an application-specific microprocessor having a machine language; a memory arranged for storing a program for execution on the processor, the program having a non-directly executable portion containing microcontroller-like instructions in a non-directly executable format, and a directly executable portion containing DSP-like instructions in the machine language; and a pre-processing unit arranged to convert the non-directly executable portion into machine language instructions; wherein when the program is executed on the processor, the non-directly executable portion of the program is pre-processed by the pre-processing unit into machine language instructions, and directly executable portion of the program is directly executed, such that the processor executes both the DSP-like instructions and the microcontroller-like instructions.

Preferably the non-directly executable format is a virtual language, and the pre-processing unit is a virtual-to-machine language translator, arranged to translate the non-directly executable portion of the program into the machine language.

The non-directly executable format is preferably a compressed virtual language, and the pre-processing unit includes a decompressor and a virtual-to-machine language translator, such that when the program is executed on the processor, the non-directly executable portion of the program is decompressed and then translated into machine language instructions.

Preferably the non-directly executable format is a compressed machine language format, and the pre-processing unit is a de-compression unit. The application-specific microprocessor is preferably incorporated in a mobile telephone.

In this way both DSP-like instructions and microcontroller-like instructions can be executed in a single processor.

BRIEF DESCRIPTION OF THE DRAWINGS

An exemplary embodiment of the invention will now be described with reference to the drawings, in which.

DETAILED DESCRIPTION OF A PREFERRED EMBODIMENT

Figure 1:
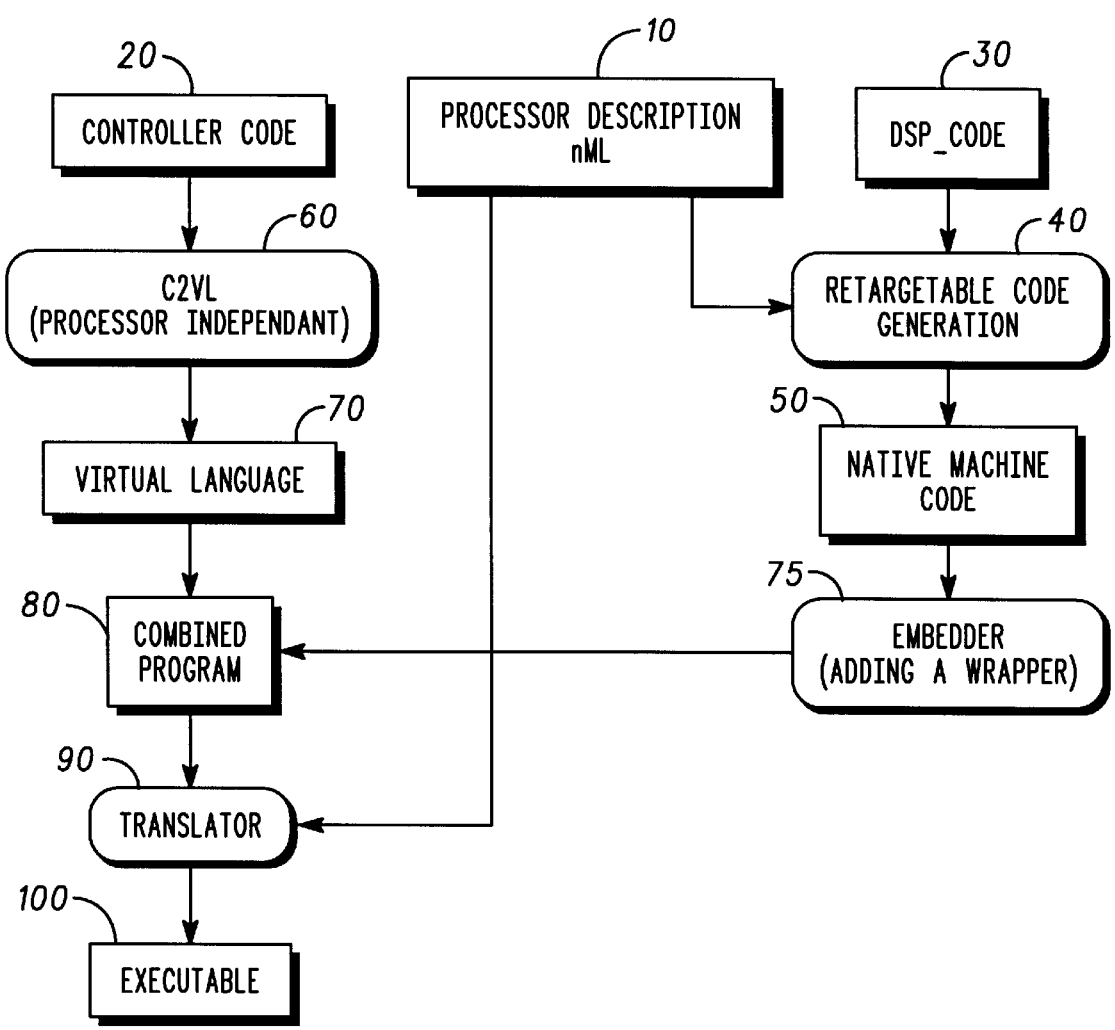
FIG. 1 shows a flow diagram of a method of executing instructions in accordance with a first aspect of the invention.

Referring to FIG. 1, there is shown a flow diagram of the method steps required for executing instructions on an Application-Specific Instruction microprocessor (ASIP), such as a processor used in a mobile telephone.

Figure 3:
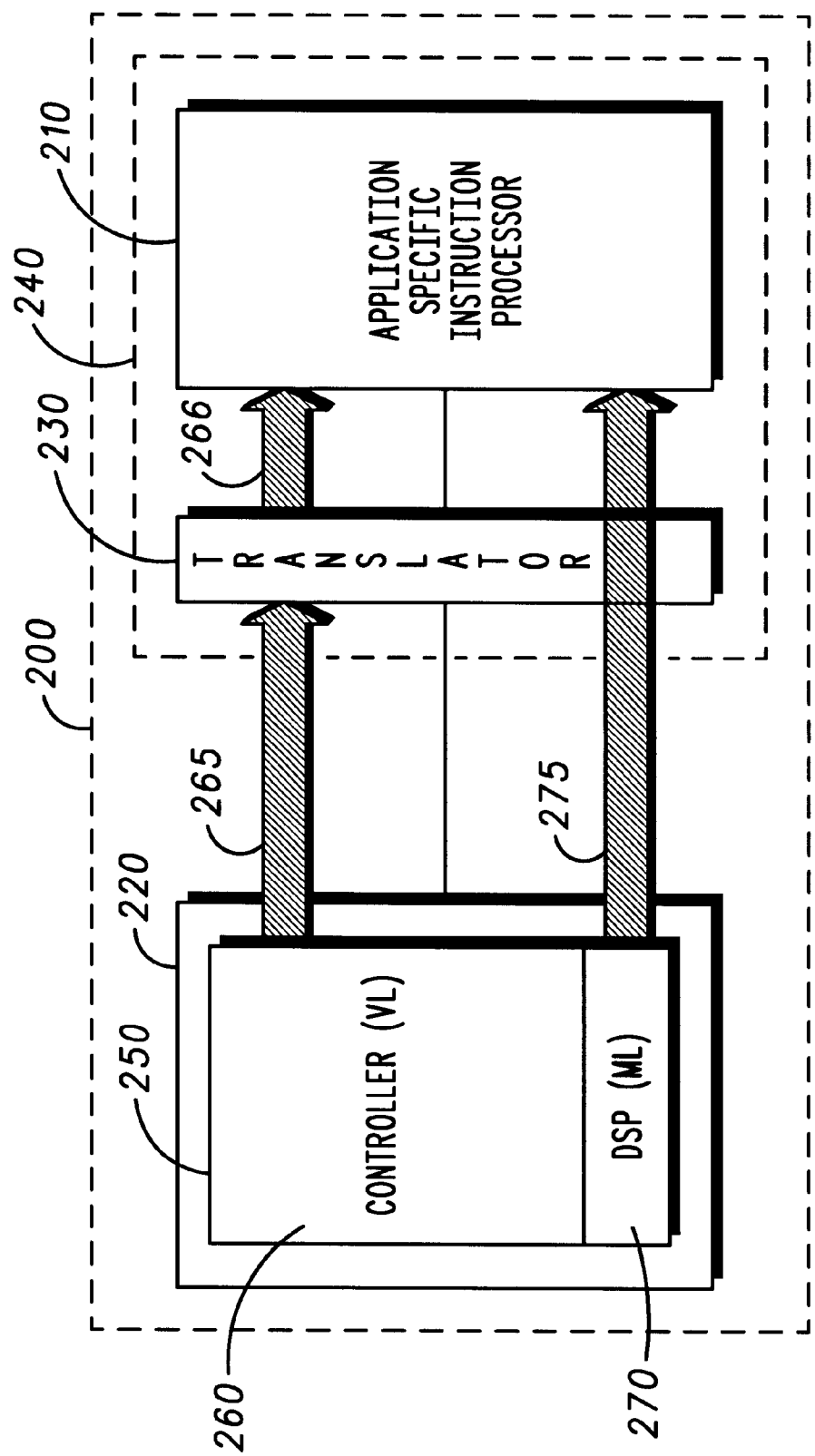
FIG. 3 shows a microprocessor system arranged for performing the method of FIG. 1.

Referring also to FIG. 3, there is shown a microprocessor system 200, comprising an ASIP 210 and a memory 220.

The microprocessor has a native machine language, and the processor manufacturer provides a processor description which includes details of the machine language and translation information, when the processor is supplied. The processor description (block 10) is used by a software programmer to ensure that instructions written by the programmer will execute as intended on the microprocessor.

In a mobile telephone, two major functions require microprocessors. System functions manage the operation of the telephone. The functions include management of user input devices such as a keypad, control of transmission and reception of data, and various menu options such as stored telephone numbers. System functions are usually defined in a controller code (block 20) which is a series of instructions written in a high level language.

The second major function of a mobile telephone which requires a microprocessor is the handling of data transmitted and received by the mobile telephone. The data is typically digital data, and it is typically subject to complex compression/decompression and filtering algorithms. In the prior art, a dedicated Digital Signal Processor (DSP) is provided in the mobile telephone to process these algorithms. The algorithms are usually defined in DSP code (block 30).

Software tools are available (block 40) which will generate a program in processor specific machine language, using the processor description. Such tools can be used to create DSP executable instructions (block 50) from the DSP code (block 30).

Software tools are also available (block 60) which will generate a program in a virtual (processor independent) language (block 70), from a set of highlevel instructions. Such tools can be used to create a virtual language program (block 70) from the controller code (block 20).

The virtual language program (70) is translated at execution time by a translator. A translator (230) of FIG. 3 is provided on a chip (240) which also includes the ASIP (210). The translator (230) may be hardware or software, and uses the processor description of the microcontroller, to translate virtual language into the ASIP (210)-specific machine language.

In the prior art the two processors operate in parallel, and share a dual-port memory. The microcontroller manages the activities of the DSP and the dual-port memory.

In the present invention the single ASIP 210 is used. A single processor description (block 10) is used by the software tool (40) to create DSP executable instructions (50) from the DSP code (30), in the ASIP specific machine language. The same processor description (10) is used to write the translator software (block 90), if one has not already been provided by the ASIP supplier. The translator software may be on- or off-chip (inside or outside the ASIP).

The virtual software tool (50) generates the virtual program (70), from the controller code (20). The DSP executable instructions (60), which are already in the ASIP specific machine language, are marked (block 75) to signify that they are directly executable. The marking may be in the form of a start and end flag, analogous to speech marks, or a short piece of header code which identifies the length of the DSP executable instructions (50). The virtual program (70) and the marked DSP executable instructions (75) are then combined in a single program 80, which thereby has virtual and non-virtual portions.

Figure 2:
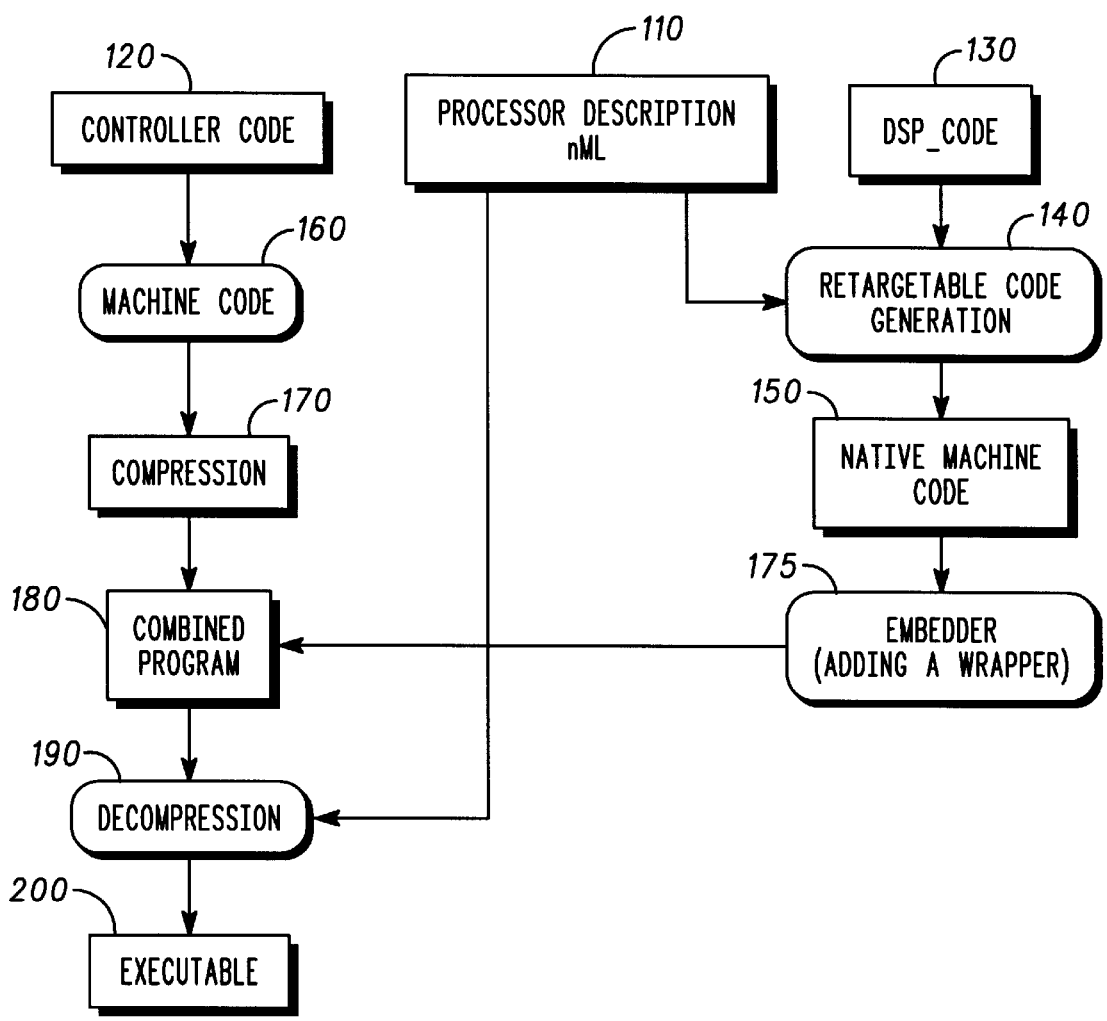
FIG. 2 shows a flow diagram of a method of executing instructions in accordance with a second aspect of the invention.

The program 80 may be stored in Read-Only Memory (ROM) of the mobile telephone, such as the memory 220 of FIG. 2. The memory 220 contains such a program 250. When the program 250 is executed (block 100) the translator 230 translates virtual language portions 260 of the program 250 into machine language instructions whereupon they are executed by the ASIP 210 (arrows 265 and 266).

When the translator 230 encounters marked instructions 270, it recognises them as being in machine language, and they are directly executed by the ASIP 210 (arrow 275).

In this way the ASIP executes both the DSP-like instructions and the microcontroller-like instructions.

Referring now also to FIG. 2, a similar method is shown to that of FIG. 1 above, except that instead of the virtual language, the controller code is provided as compressed machine code, and instead of the translator 90, a decompression unit or algorithm (block 190) is used.

Again a single processor description (block 110) is used by the software tool (40) to create DSP executable instructions (block 150) from the DSP code (130), in the ASIP specific machine language. The same processor description (110) is now used to translate the controller code (block 120) into ASIP specific machine code (block 160).

A compression software tool generates compressed code (block 170). The DSP executable instructions (150), which are in the ASIP specific machine language, are marked (block 175) to signify that they are directly executable. The compressed code (170) and the marked DSP executable instructions (175) are then combined in a single program 180, which thereby has compressed and non-compressed portions.

Again the program 80 may be stored in ROM of the mobile telephone. When the program 250 is executed (block 200) the decompression unit 190 decompresses the compressed portions of the program (block 180) into machine language instructions whereupon they are executed by the ASIP 210.

When the decompression unit 190 encounters marked instructions, it recognises them as being in non-compressed machine language, and they are directly executed by the ASIP 210.

It will be appreciated that alternative embodiments to the one described above are possible. For exarnple, the translator 230 could be provided off-chip (not located on the same integrated circuit 240 as the ASIP 210).

Also, the virtual language code could be compressed using a compression algorithm, before being combined with the DSP instructions, such that when executed, decompression and virtual translation are performed on the controller code. This would require a translator combined with a decompressor.

Furthermore, the marking of the DSP executable instructions could be performed in a way other than those described above.

What is claimed is:

1. A method for executing instructions on an application-specific microprocessor having a machine language with a processor description, comprising the steps of:

providing microcontroller-like instructions in a non-directly executable format, for execution on the processor;

compiling, using said processor description, high-level DSP-like functions into DSP-like instructions into a directly executable format for execution on the processor;

combining the microcontroller-like instructions with the DSP-like instructions to produce a program, the program having a non-directly executable portion and a directly executable portion respectively;

executing the program by pre-processing, using said processor description, the non-directly executable portion of the program into directly executable instructions, and by directly executing the directly executable portion of the program, such that the application-specific microprocessor executes both the DSP-like instructions and the microcontroller-like instructions.

2. The method of claim 1, wherein the non-directly executable format is a virtual language, and the pre-processing is a virtual-to-machine language translation, arranged to translate the non-directly executable portion of the program into the machine language.

3. The method of claim 2, further comprising the step of compressing the virtual language microcontroller-like instructions before the combining step; and wherein the pre-processing step also includes a decompression step arranged to decompress the non-directly executable portion of the program before the translation step.

4. The method of claim 1 wherein the non-directly executable format is a compressed machine language format, and the pre-processing unit is a de-compression unit.

5. The method claim, 1 wherein the application-specific microprocessor is incorporated in a mobile telephone.

6. A microprocessor system for executing instructions, comprising:

an application-specific microprocessor having a machine language with a processor description;

a memory arranged for storing a program for execution on the processor, the program having a non-directly executable portion containing microcontroller-like instructions in a non-directly executable format, and a directly executable portion containing DSP-like instructions in the machine language compiled from high level DSP-like functions using said processor description; and a pre-processing unit arranged to convert, using said processor description, the non-directly executable portion into machine language instructions;

wherein when the program is executed on the processor, the non-directly executable portion of the program is pre-processed by the pre-processing unit into machine language instructions, and directly executable portion of the program is directly executed, such that the processor executes both the DSP-like instructions and the microcontroller-like instructions.

7. The system of claim 6, wherein the non-directly executable format is a virtual language, and the pre-processing unit is a virtual-to-machine language translator, arranged to translate the non-directly executable portion of the program into the machine language.

8. The system of claim 6, wherein the non-directly executable format is a compressed virtual language, and the pre-processing unit includes a decompressor and a virtual-to-machine language translator, such that when the program is executed on the processor, the non-directly executable portion of the program is decompressed and then translated into machine language instructions.

9. The System of claim 6, wherein the non-directly executable format is a compressed machine language format, and pre-processing unit is a de-compression unit.

10. The System of claim 6, wherein the application-specific microprocessor is incorporated in a mobile telephone.

* * * * *